March 15, 1960 W. H. MEYER 2,928,358
RAILWAY TRUCK
Filed June 24, 1953 6 Sheets-Sheet 1
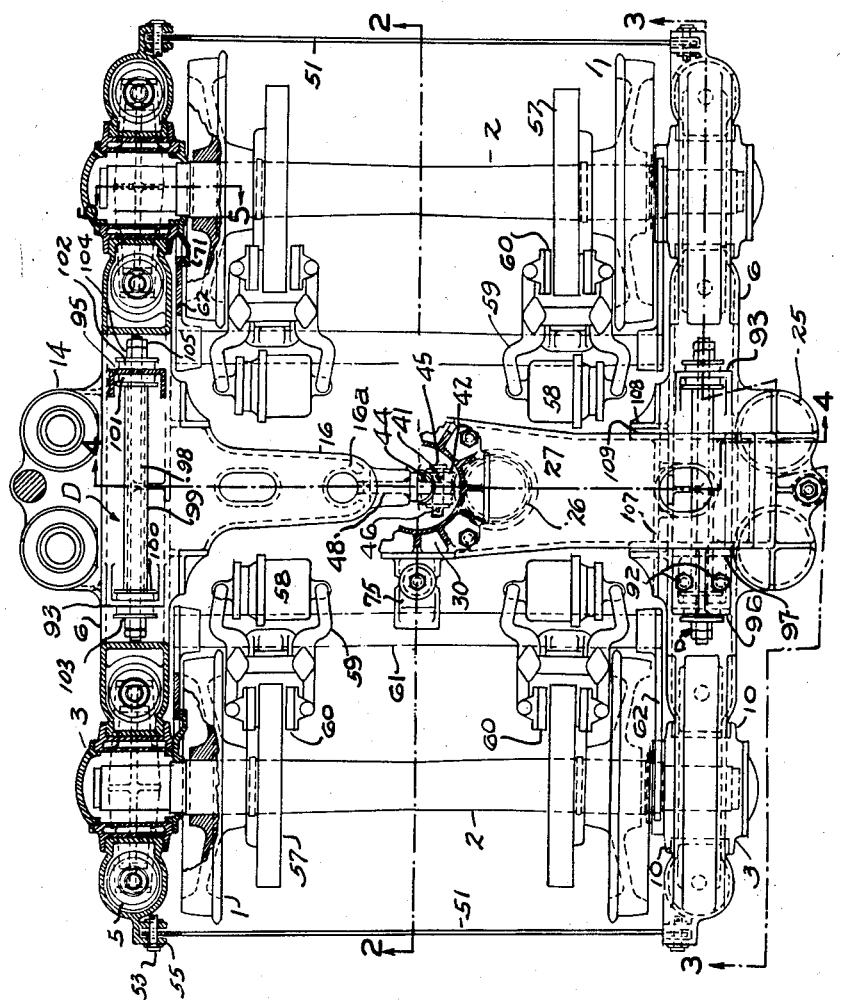
INVENTOR.
William H. Meyer
BY Rodney Bedell
ATTORNEY March 15, 1960 W. H. MEYER 2,928,358
RAILWAY TRUCK
Filed June 24, 1953 6 Sheets-Sheet 2
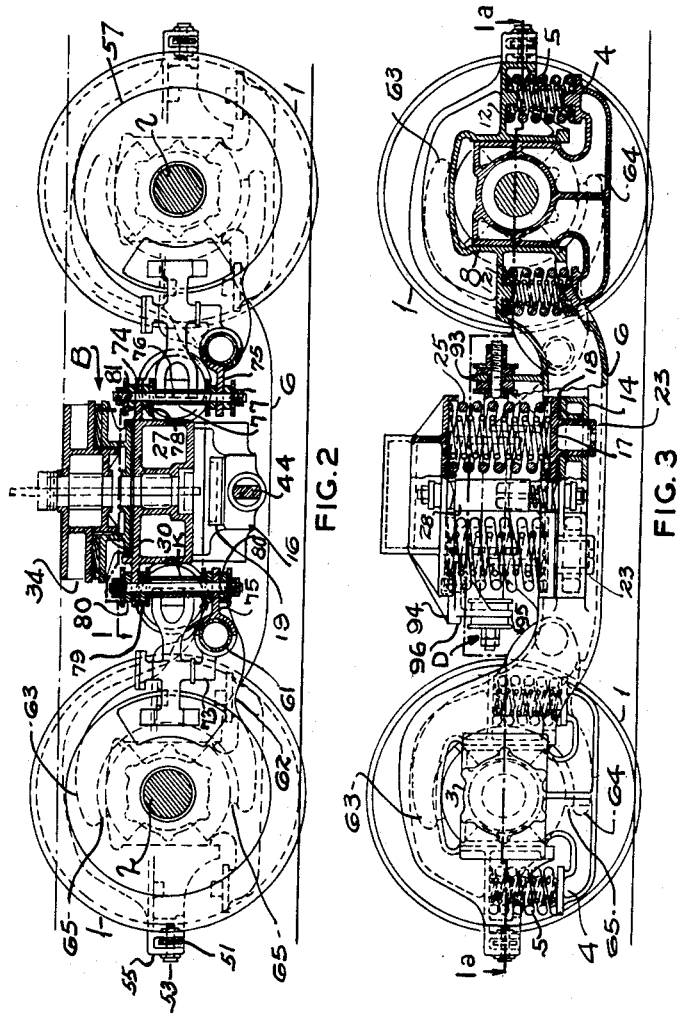
INVENTOR.
William H. Meyer
BY Rodney Bedell
ATTORNEY March 15, 1960 W. H. MEYER 2,928,358
RAILWAY TRUCK Filed June 24, 1953 6 Sheets-Sheet 3

INVENTOR.
William H. Meyer
BY Rodney Bedell
ATTORNEY

March 15, 1960     W. H. MEYER     2,928,358
RAILWAY TRUCK
Filed June 24, 1953     6 Sheets-Sheet 4
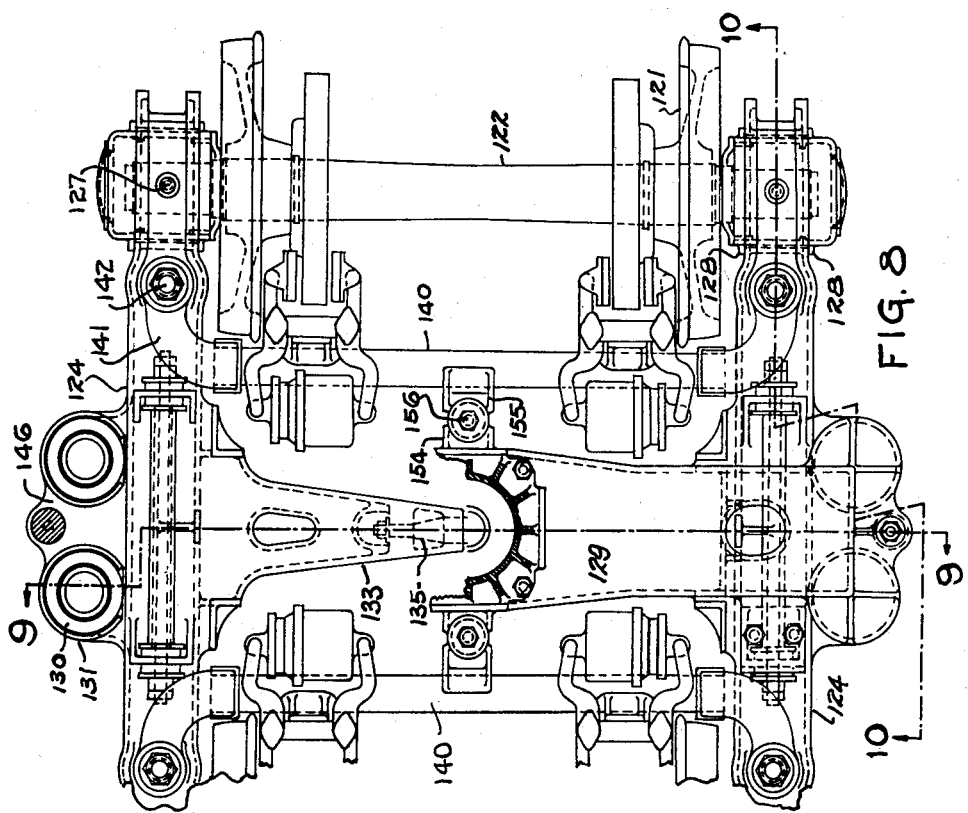
INVENTOR.
William H. Meyer
BY Rodney Bedell
ATTORNEY March 15, 1960
W. H. MEYER
2,928,358
RAILWAY TRUCK
Filed June 24, 1953
6 Sheets-Sheet 5
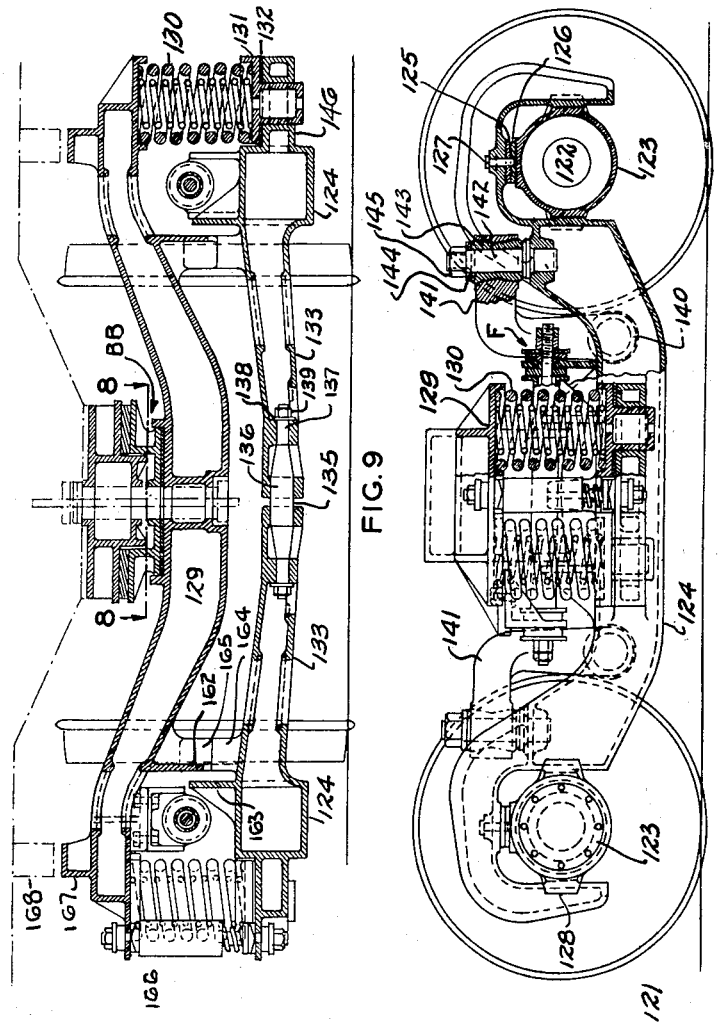
INVENTOR.
William H. Meyer
BY Rodney Bedell
ATTORNEY March 15, 1960 W. H. MEYER 2,928,358
RAILWAY TRUCK
Filed June 24, 1953 6 Sheets-Sheet 6
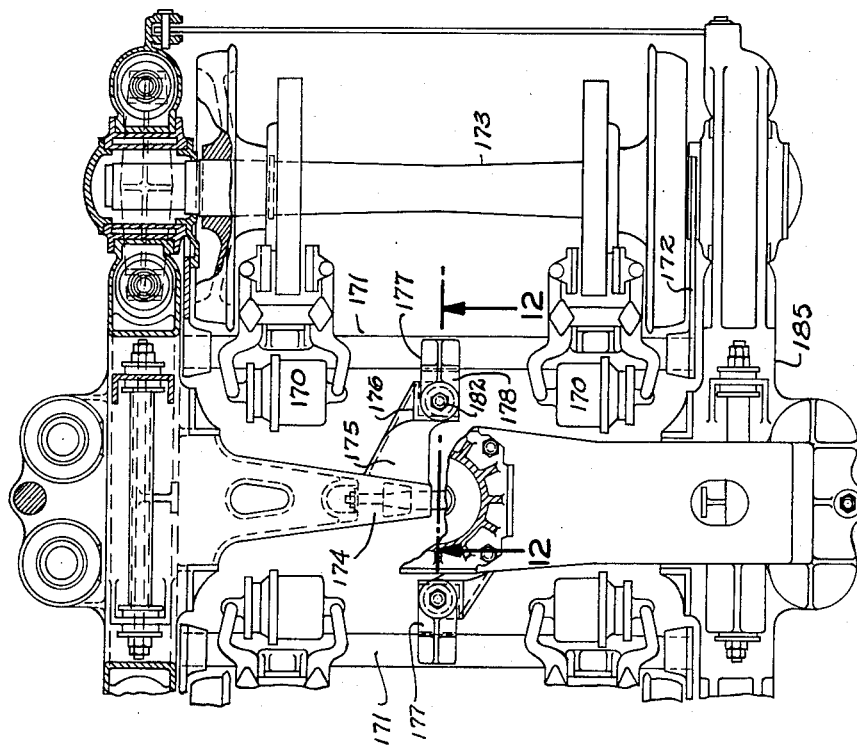
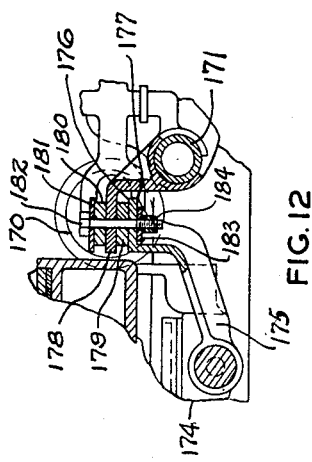
INVENTOR.
William H. Meyer
BY Rodney Bedell
atty.

United States Patent Office 2,928,358
Patented Mar. 15, 1960

2,928,358

RAILWAY TRUCK

William H. Meyer, St. Louis, Mo., assignor to General Steel Castings Corporation, Granite City, Ill., a corporation of Delaware Application June 24, 1953, Serial No. 363,782

10 Claims. (Cl. 105—192)

The invention relates to railway vehicle trucks and more particularly to the support of the load-carrying structure of the truck on the truck wheel and axle assemblies.

To provide better service, passenger carrying railway trains particularly are being run at increasingly higher speeds than heretofore. The track conditions and the passenger carrying capacities of the cars have remained substantially the same, but to avoid use of larger and more powerful locomotives for the higher speeds, the weights of passenger carrying cars have been substantially reduced. Reduction in the weights of cars and higher speeds create new problems in truck design which must be solved in order to obtain good and safe riding conditions. These new problems in truck design involve safety, weight, simplicity, spring systems, brakes, lateral stability, cushioning of lateral shocks, prevention of truck gallop, prevention of truck shimmy, and wear of the parts.

The main object of the invention is to provide a simple, safe, light weight, and easy riding four wheel railway passenger truck, having a spring system which will cushion lateral shocks and prevent or reduce their transmission to the car body and which will provide lateral stability.

Another object of the invention is to provide a truck having a minimum number of parts so that it weighs substantially less than trucks generally used and so that the construction is simplified. This object is partly attained by avoiding use of a spring-supported truck frame on equalizers as now generally embodied in trucks for railway passenger cars. This eliminates the main truck part frequently causing galloping action of the truck due to the vertical oscillation of its supporting springs, which results in longitudinal shocks to the car body.

A further object of the invention is to provide a truck substantially free of truck shimmy and truck gallop and which will cushion lateral shocks and provide a great amount of lateral stability, all of which will produce easy riding. This is accomplished by providing a frictional central bearing on the truck bolster to prevent truck shimmy; by eliminating the usual truck frame and its spring support between the axles, which spring positions may result in objectionable tilting action in a vertical longitudinal plane, termed "galloping"; and by supporting the bolster on springs mounted directly on the intermediate portions of equalizers, the bolster springs being adapted to distort under lateral shocks to cushion such shocks and being located outwardly of the equalizers to provide lateral stability against car body overturning forces.

A still further object of the invention is to provide a truck having disc type brakes for each wheel and axle assembly supported at least in part by truck framing parts such as the spring borne truck bolster or spring borne side members, such supports constituting points of application of brake reaction forces and being located a considerable distance inwardly from the respective axles, thus contributing in a large measure in keeping the weight of the framing parts at a minimum. If wheel tread engaging clasp brakes were provided instead of disc brakes, other supports located outwardly of the wheel and axle assemblies would be required and the framing parts for supporting such brakes would be much larger and heavier.

Another object of the invention is to provide a truck having a disc brake which is partly supported on the journal boxes and partly on a spring borne member of the truck. This is accomplished by either supporting the central portion of the brake on the spring supported bolster or on an inward extension of a side member which is spring-supported from the journal boxes.

Another object of the invention is to provide a truck having a disc brake in which the brake shoes and brake cylinder portions are supported partly by the equalizers or side frame members of the truck and partly by the spring-supported bolster.

Another object of the invention is to provide a truck of simple light-weight design with all framing structure spring borne including the equalizers or truck side members.

Another object of the invention is to provide a truck in which the truck side members also act as equalizers and opposing side members have inward extensions intermediate their ends pivotally connected to each other so as to hold them against relative movement longitudinally of the truck while providing for their relative tilting action in vertical longitudinal planes so as to accommodate vertical movements of the end portions of the equalizers or side members due to track irregularities.

Another object of the invention is to provide a truck having only three main framing parts comprising two side members and a bolster spring-supported on the side members intermediate the ends of the latter and with the springs so arranged and located on the side members to provide lateral stability against car body over-turning forces. This is accomplished by providing brackets extending outwardly of the side members for mounting the springs which support the ends of the bolster and by providing inwardly extending brackets on the intermediate portions of opposing side members with their inner ends pivotally connected to prevent relative movement of the side members longitudinally of the truck while permitting relative tilting action of the side members in vertical longitudinal planes.

Another object of the invention is to provide a truck having only three main framing parts comprising two side members and a bolster, opposing side members having inwardly extending spring supporting brackets pivotally connected to each other at their inner ends and also having outwardly extending spring-supporting brackets with bolster supporting springs mounted on all of said brackets, whereby a great amount of lateral stability is obtained and the connecting portions of the inner ends of the inward extension of the side members are substantially relieved of bending moments and whereby the bolster is also relieved of a large proportion of the bending moments otherwise applied at its central portion and consequently is made lighter than would be the case if no springs were provided on the inward extensions of the side member.

Other objects will be apparent to those skilled in the art from the following description and the accompanying drawings, in which:

Figure 1 is a top view of a truck embodying one form of the invention with portions in section taken on lines 1—1 of Figure 2 and 1a—1a of Figure 3.

Figure 2 is a longitudinal vertical section taken on the line 2—2 of Figure 1.

Figure 3 is in part a side view and in part a vertical section taken on line 3—3 of Figure 1.

Figure 8 is a top view of a truck embodying another form of the invention with portions in section taken on line 8—8 of Figure 9 and with the bolster omitted from the lower half of the figure.

Figure 9 is a transverse vertical section taken on the line 9—9 of Figure 8.

Figure 10 is in part a side view and in part a vertical section taken on the line 10—10 of Figure 8.

Figure 11 is a top view of the middle and one end of a truck embodying another form of the invention with the bolster broken away near the middle of the truck to better illustrate the structure beneath the bolster.

Figure 12 is a detail vertical section taken on the line 12—12 of Figure 11.

Figure 4:
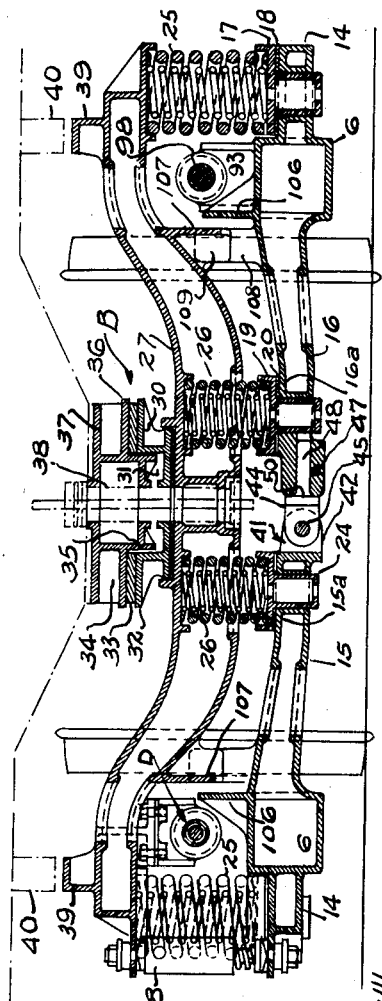
Figure 4 is a transverse vertical section taken on line 4—4 of Figure 1.
Figure 5:
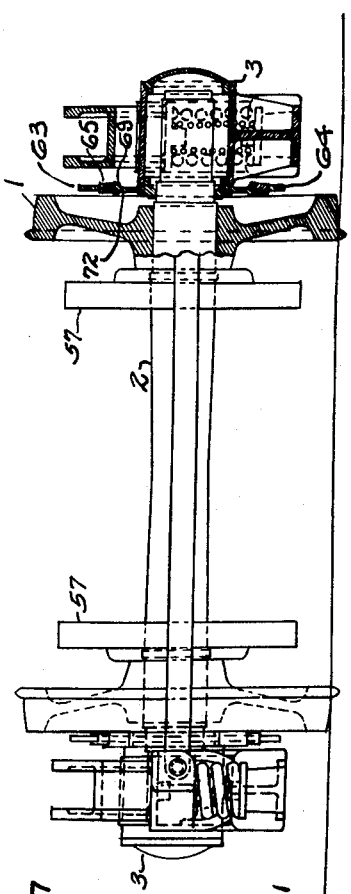
Figure 5 is in part an end view and in part a sectional elevation taken on line 5—5 of Figure 1.

The four wheel truck shown in Figures 1–5 includes wheels 1, axles 2, journal boxes 3 of the wing type including longitudinal extensions on opposite sides forming spring seats 4. Double coil spring units 5 are mounted on spring seats 4 and support equalizers or side members 6 extending between corresponding boxes at the sides of the truck.

Each side member is provided with a pair of pedestal jaws 8 slidably receiving a journal box 3 between them and the boxes have flanges 10 at the sides of the pedestal jaws. Opposing upright faces of jaws and boxes slide on each other vertically but hold these parts against relative movement longitudinally and transversely of the truck. Pedestal jaws 8 are provided with spring cap portions 12 resting on springs 5. Between its pedestal spring cap portions 12 each side member is substantially of box section and includes outwardly extending spring support brackets 14 at its center portion for springs spaced apart longitudinally of the truck. Spring seats 17 and shims 18 are mounted on brackets 14.

The intermediate portion of the left hand side member 6 is provided with an inward extension 15 (Figure 4) and the intermediate portion of the right hand side member 6 is provided with an inward extension 16. Extensions 15 and 16 also form spring supports 15a, 16a near the center of the truck. Spring seats 19 and shims 20 are mounted on extensions 15 and 16. Supports 14 and extensions 15 and 16 are provided with circular openings to receive downward projections 23 and 24 on spring seats 17, 19, respectively. The downward projections 23 and 24 are adapted for engagement by jacks for raising the spring seats for the insertion or removal of shims under the spring seats. Double coil springs 25 are mounted on spring seats 17 and double coil springs 26 are mounted on spring seats 19.

A truck bolster 27 is supported on all of the spring units 25 and 26. The four outer spring units 25 support approximately sixty-five percent of the bolster load while the two spring units 26 support approximately thirty-five percent of the bolster load. The proportion of the bolster load that the two groups of spring units support will depend upon the distance that their points of support are located inwardly and outwardly from the longitudinal center line of the supports of side members 6 on the journal boxes. This may be varied as desired, but the main object of locating the spring units 25 which carry the greater proportion of the loads outwardly of the side members 6 is to provide a greater amount of lateral stability to resist the lateral overturning forces of the car body and at the same time provide greater vertical flexibility and consequently softer riding.

Vertically disposed telescoping snubbing devices 28 are provided between extensions 14 and the ends of bolster 27 to control or snub the bolster support springs. If desired, other types of snubbing devices, such as hydraulic shock absorbers, may be used to snub the bolster springs. If desired, snubbers may also be used to snub the spring units 5 on the journal boxes.

Mounted on the center portion of the bolster is a central bearing indicated generally at B (Figure 4) and disclosed in Patent No. 2,655,117. This central bearing includes a lower member 30 having a central cylindrical recess 31 and a horizontal annular bearing 32 extending radially outwardly of recess 31. Mounted on the annular bearing 32 is a ring-like disk 33, having a higher coefficient of friction than the bolster metal, and mounted on frictional member 33 is an upper member 34 including a downwardly projecting cylindrical member 35 projecting into recess 31 of lower member 30. The upper member 34 also includes an annular member 36 extending radially outwardly of central cylindrical member 35 and engaging the upper surface of frictional member 33. Upper member 34 is secured to the underside of the car body underframe by bolting or riveting or welding its top element 37 to the body underframe. A center pin 38, indicated in dot-dash lines, holds the truck in assembled relation with the car body when the car is lifted for any reason or in the event of derailment of the truck. Annular members 32 and 36 are of such diameter that the body bolster and body underframe are held in parallel relation at all times during the normal operation of the car but the bolster is provided with stops 39 and the car body with stops 40 spaced apart during normal operation of the truck and only contacting should there be derailment of the truck or any other unusual overturning forces applied to the car body.

The central bearing is also of such diameter that the area of the frictional element offers sufficient resistance to swivel action to prevent shimmy of the truck. At the same time, it will allow the car to negotiate curves without danger of derailment. This central bearing arrangement is such that the body load during normal operation is always transmitted through it and therefore the resistance to swivel action remains constant. This differs from the ordinary relatively small diameter center bearing on which the vehicle body tilts transversely so that some of the load during normal operation is transferred to the side bearings.

The inner end of side member extension 15 is provided with a vertically extending slot 41 (Figure 4) formed by spaced lugs 42. A connector has a rectangular portion 44 inserted in slot 41 and pivotally secured to lugs 42 by a horizontal pin 45 having a cotter 46. The inner end of side member extension 16 is provided with a cylindrical opening 47 to receive a cylindrical portion 48 on the other end of the connector. Connector 44, 48 prevents the side members 6 from moving longitudinally relative to each other so as to prevent unsquaring of the truck, but permits relative tilting of the side members in vertical longitudinal planes. This accommodates relative vertical movements of the ends of side members 6 when the wheels move upwardly and downwardly due to track irregularities. Pin 45 also permits slight rotation of the side members 6 about their longitudinally extending axes when there is relative tilting of the side members in vertical longitudinal planes or when there is a slight difference in deflection between the inner and outer bolster spring units.

Connector 44, 48 has a face 50 which engages the adjacent end of extension 16, and this, together with the pivotal connection of the rectangular portion 44 by pin 45 with the slotted portion of extension 15, prevents inward movement of members 6 except where they would move inwardly due to a slight pivoting about pin 45.

Transversely extending tie bars 51 are connected to the end portions of the side members 6 by pins 53 inserted through spaced lugs 55 at the ends of the side members 6 and through the end portions of the transverse ties 51. This prevents relative angular movement of side members 6 in a horizontal plane due to play between connector 43, pin 45, and the end portions of extensions 15 and 16 and also due to any play between the flanges of the journal boxes and the side members and between the box and the axle journal.

Each wheel and axle assembly is provided with spaced apart brake discs 57. Brake mechanism to engage each disc 57 comprises air cylinders 58, levers 59, and shoes 60. This brake mechanism is mounted on a structure supported in part by the journal boxes and extends from one journal box at one end of a wheel and axle assembly to the journal box on the other end. This structure comprises a transversely extending tubular frame member 61 and an arm 62 at each end of member 61. The arms 62 have vertically spaced portions 63, 64 (Figures 2, 3) with rubber bearings 65 engaging vertically spaced flanges 69 on the journal box inner closure plates 72 (Figure 5) and absorbing vibrations resulting from shocks transmitted from the rails to the wheels and then to the journal boxes. The interengaging surfaces of bearings 65 and box flanges 69 are circular and of the same radius about the journal axis. This permits pivotal action of the brake support structure about the journal axis and provides for movement of the brake mechanism vertically with the brake discs 57 and when the wheels move vertically due to track irregularties. It also keeps faces of brake shoes 60 parallel with the side faces of brake discs 57 at all times. The brake mechanism support structure 61 and 62 is held in transverse position in the truck partly by brackets 71 on journal box inner closure plates 72. Brackets 71 engage the inner surfaces of the adjacent arms 62. The brake mechanism comprising air cylinders 58, levers 59, and shoes 60 are mounted on the support member 61 by brackets 73 as indicated in Figure 2. Brackets 73 may be secured to member 61 by welding or otherwise.

The brake mechanism support structure 61, 62 is also supported along the longitudinal center line of the truck by the truck bolster 27 as indicated at K (Figure 2). The bolster is provided with a bracket 74, and the transverse brake support member 61 is provided with a bracket 75 secured to it. Both brackets 74 and 75 are connected by an elongated anchor comprising an inner rod 76, tubular spacer 77 with circular flanges 78, rubber pads 79 between flanges 78 and the adjacent brackets on the bolster and support structure, rubber pads 80 on the other sides of brackets 74, 75, and washers or collars 81 engaging the outer faces of pads 80. The end portions of the inner rods 76 are threaded and provided with nuts at their ends to hold the parts together and at the same time place the rubber pads 79, 80 in compression. The rubber pads 79, 80 form a cushioned connection between the brake support and the bolster and at the same time permit slight angular movement in a vertical longitudinal plane between the brake support structure and the bolster when there is vertical movement of the wheel and axle assemblies relative to the bolster. The rubber pads also accommodate slight tilting action of the transverse member 61 relative to the bolster in a transverse vertical plane.

Each side member 6 is provided with an upwardly extending bracket 93 (Figure 3) spaced from one side of bolster 27, and the bolster is provided with an outwardly and horizontally extending bracket 94 on the side remote from bracket 93. Each bracket 94 is in longitudinal alignment with a bracket 93. A separate bracket 95 is secured by bolts 92 to the underside of each bolster bracket 94 and fits between depending shear lugs 96 and 97 on bracket 94 to relieve the bracket securing bolts 92 of shearing forces. Elongated anchors D extending longitudinally of the truck are connected at their end portions to corresponding pairs of brackets 93 and 95 to hold the bolster and side members in spaced relation with each other longitudinally of the truck while permitting some relative vertical and transverse movement between them. Each anchor D comprises an inner rod 98, a tubular spacer 99 with flanges 100 at its ends, inner rubber discs 101 between flanges 100 and brackets 93 and 95, rubber pads 102 on the outer sides of brackets 93, 95, and washers or collars 103 on the outer sides of pads 102. Inner rod 98 is threaded at its end portions and is provided with nuts 104 for clamping the anchor to the brackets 93, 95 and placing the rubber pads 101 and 102 under some compression for the anchor to be similar to a rigid connection between the parts. Lock nuts 105 are also provided on the ends of the inner rod 98 to prevent loosening of nuts 104.

Anchors D are located in longitudinal alignment with the axle journal centers transversely of the truck and inwardly of the outer spring units 25, 26. This also places them in the same vertical plane as the longitudinal centers of side members 6, and the longitudinal forces acting between the side members and the bolster do not subject the side members to longitudinal eccentric forces as in previous arrangements in which anchors are connected to the side members or equalizers at points spaced outwardly of the longitudinal center lines of the side members. Brackets 93, 95 on the side members and bolster, respectively, are located about the same distance from, but on opposite sides, of the transverse center line of the truck.

By positioning the anchors symmetrically of the transverse center line of the truck, they may be made longer than if they were asymmetrically of that center line and connected to the frame side member and to the bolster end portion in the usual manner and without interference with other truck parts or standard clearance limits. Accordingly the vertically angular tilt of the anchor and the corresponding reduction in the horizontal distance between its ends is less than it would be if the anchor were short enough to be connected at one end to the bolster near the transverse center line and to the frame side member at a suitable point spaced from the bolster. When such longitudinal movements occur between the bolster and side members, they sometimes transmit shocks or vibrations from the truck bolster to the car body, and it is an object of this invention to minimize or eliminate the transmission of such shocks or vibrations.

By locating anchors D in the same vertical plane as the plane of the journal centers, brackets 93, 95 can be reduced in size as compared to outwardly extending brackets of previous designs with the anchors located outwardly of the side members. This provides for minimum weight of the side member.

Brackets 95 are made separable from the bolster to facilitate assembling and disassembling anchors D. With separate brackets the inner rods 98 can be applied and removed without providing space at their ends for applying and removing them longitudinally through the openings in brackets 93, 95 if both were integral with the corresponding parts. When bracket 95 is disconnected from the bolster, the anchor could be moved laterally beyond side member 6 and rod 98 could then be moved longitudinally. If desired, however, bracket 95 could be formed integral with bracket 94 and if the bolster is raised slightly, inner rod 98 could be moved longitudinally above the spring cap portion enough for application or disassembly of the parts.

Stops 106, 107 on side member 6 and bolster 27, respectively, limit relative lateral movement of the side members and bolster due to lateral flexibility of the bolster supporting springs. During normal operation of the truck, these stops will not come in contact with each other, but they provide a safety means against excessive lateral movements which may occur if the truck is derailed or if any other unusual condition produces excessive lateral movements.

Stops 108 are also provided on each side member 6 to engage adjacent end portions 109 of stops 107 on bolster 27. These latter stops prevent excessive relative movement between the side members and the bolster longitudinally of the truck if anchors D get loose or get entirely disconnected.

Figure 7:
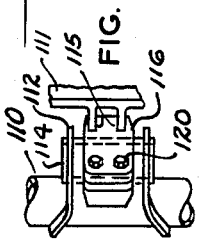
Figure 7 is a top view of the brake frame support shown in Figure 6.
Figure 6:
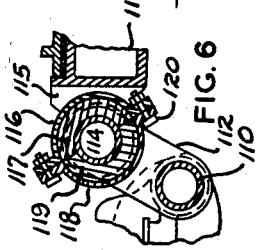
Figure 6 is a sectional view showing a modified form of the brake frame support.

Figures 6 and 7 show another arrangement for supporting the intermediate portion of a power brake carrying a tubular frame member 110 (corresponding to member 61 previously described) on a bolster 111 (corresponding to bolster 27 previously described). Frame member 110 is provided with upright bracket elements 112, mounting a tubular element 114. Bolster 111 has upright bracket elements 115 mounting a semi-cylindrical housing 116, provided with a half-ring rubber element 117 receiving tubular element 114. A complementary semi-cylindrical housing 118 provided with a half-ring rubber element 119 is clamped about tube 114 and to housing 116 by bolts 120. This arrangement, due to distortion of rubber elements 117 and 119 in shear, permits tilting action of the brake parts relative to the bolster in a vertical plane longitudinally of the truck and also, due to distortion of rubber members 117 and 119 in shear and compression, a slight amount of tilting in a transverse vertical plane. Rubber members 117 and 119 also cushion shocks which otherwise would be transmitted to the bolster and then to the car body.

Figures 8, 9 and 10 show another form of the invention including wheels 121 and axles 122 as in the first arrangement, but the side members 124 are mounted directly on the journal boxes 123 as indicated in Figure 10. During normal operation of the truck there is no relative vertical movement of the journal boxes and side members. Renewable wear plates 125 and 126 are provided on the side members and journal boxes, respectively. Journal boxes 123 are of the anti-friction type and may be mounted on the axle journals in any well known manner which will prevent relative axial movement of the boxes and axles. A pin 127 extends through each side member end portion, through the renewable plate 125, and partly into a hole in the renewable plate 126 which is secured to the top of the journal box by any well known means, such as welding, riveting, etc. The journal box and the anti-friction bearing parts are mounted on the axle journals to prevent axial movement of box and axle. Pins 127 form close fitting connections between the wheel and axle assemblies and side members 124 with substantially no play laterally of the truck between the pin-connected parts. This results in good riding and avoids excessive wear of the connected parts. The inter-engaging surface of renewable plates 125, 126 permit slight tilting of the axle relative to the side members in a transverse vertical plane as occurs when the opposite rails are at different levels. Inner and outer safety stops 128 are provided on the sides of the journal box to engage the pedestal-like portions of the side members and prevent separation in the event of failure at the pin connections 127.

Bolster 129 is supported by spring units 130 comprising inner and outer coils mounted on brackets 146 extending outwardly of the sides of the side members 124. Spring seats 131 and shims 132 for mounting these spring units on brackets 146 are also provided and are similar to those shown in the first truck arrangement. Side members 124 are also provided with inward extensions 133 but there are no spring units mounted on these extensions as in the first truck arrangement. Spring units 130 support the entire load on the side members.

The inner ends of the extensions 133 are connected to each other by a pin 135 which prevents relative movement of side members 124 longitudinally of the truck to keep the truck square and the wheels in tram, but the arrangement permits relative tilting movement of side members 124 in their respective vertical longitudinal planes to accommodate vertical movements of the wheels due to track irregularities. Locating spring units 130 outwardly of side members 124 and omitting springs at the inner end portions of extensions 133 subjects the extensions to equal vertical bending moments throughout their length because pin 135 forms a connection which ties extensions 133 together to form a continuous beam extending from one side member to the other, and pin 135 must also resist these bending moments. To better resist these bending moments and reduce the size and weight of pin 135, the central portion 136 is larger in diameter than the end portions 137. Washers 138 and nuts 139 are applied to the ends of pins 135 to prevent outward separation of side members 124. If desired, this method of connecting the inner ends of extensions 133 by a pin 135 to take vertical bending moments could also be used if the end portions of side members 124 were made similar to end portions of side members 6 of truck arrangement shown in Figures 1–5, in which latter arrangement the side members 6 are spring supported on the journal boxes and the arms 62 of the brake mechanism support structure are supported on the journal boxes.

The power brake arrangement is similar to that previously described, but the transversely extending brake support members 140 with arms 141 at their ends are connected to the side members a short distance inwardly of the journal boxes. Pins 142 are mounted in the side members, and rubber bushings 143 are inserted in the openings in the ends of arms 141 and over the pins 142. A washer 144 and a nut 145 on the threaded portion of pin 142 clamp the rubber bushings 143 and the arms 141 to pin 142. The brake support comprising members 140 and arms 141 keep the side members parallel and in transverse spaced relation without additional tie bars, such as 51 of the first truck arrangement.

The intermediate portion of each member 140 is supported from the bolster by brackets 154, 155 and an elongated anchor 156 similar to the support in Figures 1–5. The brake mechanism may tilt on pins 142 as may be necessary to accommodate relative tilting of side members 124.

Anchors F between the bolster and side members 124 are similar to those previously described and function in like manner to position the bolster longitudinally of the side members.

Stops 162, 163, 164, and 165 correspond to stops 106, 107, 108, and 109, previously described, and limit longitudinal and transverse movement of the side members and bolster. The vertical actions of the bolster supporting spring units 130 are controlled by snubbers 166, as in the first arrangement.

A large central bearing BB supports the vehicle body on the bolster and functions as does the central bearing B, previously described. Safety stops 167, 168 are provided on the bolster and body respectively and limit their relative tilting in an emergency although having no function in normal operation.

Figures 11 and 12 illustrate another arrangement for supporting the power brake mechanism 170. The main brake carrier member 171 has bifurcated arms 172 at its ends corresponding to arms 62 in Figures 1–5 and similarly mounted upon the journal boxes.

The inner end portion of each side member inward extension 174 has a bracket 175 including a horizontal shelf 176. Each brake support member 171 has a bracket 177 with a horizontal shelf 178 spaced vertically above the corresponding shelf 176. A rubber pad 179 is interposed between shelves 176 and 178. Another rubber pad 180 is mounted on top of shelf 178. A washer 181 is mounted on pad 180. A bolt 182 with a washer 183 and a nut 184 clamps the associated parts, placing rubber pads 179, 180 under slight compression and permitting tilting of the brake mechanism relative to side members 185 in vertical planes extending longitudinally and transversely of the truck.

Various objects of the invention mentioned in the introductory portion of this specification are provided for in each of the truck arrangements. In the arrangement shown in Figures 1–5, the framing members comprising side members 6 and bolster 27 are spring supported from the wheel and axle assemblies. Therefore the brake mechanism comprising cylinders 58, levers 59, shoes 60, and transverse members 61 are also largely spring borne because a large portion of their weight is supported by either the spring borne side members 6 or spring borne bolster 27.

Side members 6 form important framing members of the truck and also act as equalizers to equalize the load on the wheels on the same side of the truck. Since they have inward and outward extensions at their central portions for supporting the bolster springs with the inward extensions also connected to each other to hold side members against longitudinal movement relative to each other and also have pedestal portions and spring cap portions at their ends, and since they also must resist lateral forces adjacent to the bolster springs and to the pedestals, they are much heavier and have more complicated and uneven contours than the unsprung equalizers of the usual railway four wheel passenger truck. It is therefore advantageous to have them spring borne on the wheel and axle assemblies because if the same vertical impacts from the wheels were applied to the side members as are applied to the ordinary lighter weight forged equalizers, the impacts would be much more severe due to the greater weight and there would be a greater likelihood of greater stresses in certain portions due to uneven contours than would occur in the usual equalizers which are lighter and have more regular contours. Since the side members of the second truck arrangements are non-spring supported the transverse brake supporting members 140 with their arms 141 may be supported directly by the side members to keep the brake shoes in parallel relation with the brake discs on the axles at all times.

Details of construction of the truck may be varied largely without departing from the spirit of the invention and the exclusive use of novel structure as described as coming within the scope of the claims is contemplated.

What is claimed is:

1. In a railway truck, substantially parallel wheel and axle assemblies spaced apart lengthwise of the truck, journal boxes on the ends of the axles outboard of the wheels, side members supported from the journal boxes and each extending from box to box on the corresponding side of the truck, upright portions of said side members and journal boxes opposing each other and preventing relative movement of said side members and boxes longitudinally and transversely of the truck, each side member having a rigid lateral inboard extension intermediate its ends, the inner ends of said extensions terminating near the longitudinal center line of the truck and being spaced apart and aligned with each other transversely of the truck, a device between and connecting said extension ends and having a trunnion journaled in at least one of said ends with its axis disposed transversely of the truck and providing for relative tilting of the side members lengthwise of the truck from normally horizontal positions, said device being seated in said extension ends to avoid relative movement of said extensions lengthwise of the truck, means holding the side members against relative movement away from each other, each side member including an outboard bracket intermediate its ends, upright springs outboard of said side members and seated on said brackets, a load-carrying bolster extending from side to side of the truck with its end portions supported on said spring units, an element at each side of the truck elongated lengthwise of the truck and pivotally connected at its opposite ends to the bolster and to an adjacent side member respectively and transmitting thrust from the bolster to the side members lengthwise of the truck, said elements being inclinable transversely of their axes as the bolster moves vertically on the truck frame by the yielding of said spring units and auxiliary springs mounted on the inner end of each inboard extension and supporting the adjacent portions of the bolster.

2. A truck according to claim 1 in which the means transmitting thrust from the bolster to the side members lengthwise of the truck comprises an elongated anchor at each side of the truck substantially in the plane of the journal boxes and inboard of the bolster supporting spring on the side member brackets with one end secured to the bolster at one side of the transverse center line of the truck and with its other end secured to a side member at the other side of the transverse center line of the truck.

3. A truck according to claim 1 in which one end of each anchor is secured to a web projecting upwardly from a side member and the other end of the anchor is connected to a web projecting downwardly from the bolster, said webs being at opposite sides of the bolster and the anchor extending beneath the bolster.

4. A railway truck according to claim 1 which includes a vertically elongated telescoping snubbing device at each end of the bolster with the upper end of one telescoping part secured to the bolster and the lower end of the other telescoping part secured to the side member.

5. A railway truck according to claim 1 which includes tie rods extending transversely of the truck between the corresponding ends of opposite side members and cooperating with the device connecting the inner ends of the side member extensions to hold the side members against relative angular movement in a horizontal plane.

6. A truck according to claim 1 in which the device connecting the inboard extensions on the side members is elongated transversely of the truck and has one end portion rectangular in cross section and has its other end portion cylindrical in cross section, one of said side member inward extensions being slotted vertically and receiving said rectangular cross section portion of said device, there being a pivot pin extending longitudinally of the truck through said rectangular cross section portion and said vertically slotted extension, the other side member inward extension having a cylindrical recess receiving said cylindrical cross section portion of the device.

7. A truck according to claim 1 in which the journal boxes are provided with spring seats and springs mounted on said spring seats support the side members.

8. A railway truck according to claim 1 in which the bolster is provided with a central bearing having a body-supporting face extending horizontally over the auxiliary spring units.

9. In a railway truck, spaced substantially parallel wheel and axle assemblies spaced apart lengthwise of the truck, journal boxes on the ends of the axles outboard of the wheels, side members supported from the journal boxes and each extending from box to box on the corresponding side of the truck, upright portions of said side members and journal boxes opposing each other and preventing relative movement of said side members and boxes longitudinally and transversely of the truck, each side member having a rigid lateral inboard extension, the inner ends of said extensions being spaced apart transversely of the truck at the same level near the longitudinal center line of the truck and being substantially aligned, a device positioned between and connecting the inner ends of said extensions and providing for relative tilting movement of said extensions and members about an axis extending longitudinally of the truck, but holding said extensions and members against relative movement lengthwise of the truck, each side member including an outboard extension, spring units mounted on said outboard extensions and said inboard extensions, and a load-carrying rigid bolster extending from side to side of the truck and supported on all of said spring units and means connected to the bolster and to the side members and transmitting thrust from the bolster to the side members lengthwise of the truck.

10. A railway truck according to claim 9 which includes spring means mounted on the journal boxes and supporting the side members.

References Cited in the file of this patent

UNITED STATES PATENTS

| | | |
|---|---|---|
| 384,317 | Hubbard | June 12, 1888 |
| 1,154,202 | O'Connor | Sept. 21, 1915 |
| 1,237,166 | Burrman | Aug. 14, 1917 |
| 1,684,537 | Geiger | Sept. 18, 1928 |
| 1,751,065 | Alden | Mar. 19, 1930 |
| 1,886,533 | Davis | Nov. 8, 1932 |
| 2,026,534 | Hedgcock | Jan. 7, 1936 |
| 2,174,399 | McCune | Sept. 26, 1939 |
| 2,219,360 | Green | Oct. 29, 1940 |
| 2,267,589 | Eksergian | Dec. 23, 1941 |
| 2,354,016 | Haynes | June 18, 1944 |
| 2,365,460 | Eksergian et al. | Dec. 19, 1944 |
| 2,527,008 | Haynes | Oct. 24, 1950 |
| 2,578,554 | Janeway | Dec. 11, 1951 |
| 2,721,523 | McIntosh et al. | Oct. 25, 1955 |
| 2,737,907 | Janeway | Mar. 13, 1956 |
| 2,744,750 | Smith | May 8, 1956 |
| 2,751,855 | Krautheim | June 26, 1956 |
| 2,751,856 | Maatman | June 26, 1956 |
| 2,782,731 | Blattner | Feb. 26, 1957 |